United States Patent [19]

Moore et al.

[11] Patent Number: 4,865,356
[45] Date of Patent: Sep. 12, 1989

[54] COMPOSITE MATERIAL TUBULAR MEMBER JOINT

[75] Inventors: Norman B. Moore, Houston; Joe P. Parris, Magnolia; Edmund A. Fisher, Houston, all of Tex.

[73] Assignee: Cameron Iron Works USA, Inc., Houston, Tex.

[21] Appl. No.: 185,525

[22] Filed: Apr. 25, 1988

[51] Int. Cl.$^4$ ............................ F16L 9/12; F16L 21/02
[52] U.S. Cl. ........................................ 285/55; 285/93; 285/371; 285/404; 285/423
[58] Field of Search ............... 285/371, 398, 404, 423, 285/93, 55

[56] References Cited

U.S. PATENT DOCUMENTS

| | | | |
|---|---|---|---|
| 552,319 | 12/1895 | Farrey | 285/404 X |
| 3,101,208 | 8/1963 | Clifford et al. | 285/371 X |
| 3,140,884 | 7/1964 | Brauck | 285/404 X |
| 3,454,291 | 7/1969 | Goldsobel et al. | 285/371 |
| 3,768,842 | 10/1973 | Ahlstone | |
| 4,302,033 | 11/1981 | Evans et al. | 285/93 X |
| 4,455,040 | 6/1984 | Shinn | 285/93 X |
| 4,614,369 | 9/1986 | Overath et al. | |
| 4,619,470 | 10/1986 | Overath et al. | |
| 4,634,314 | 1/1987 | Pierce | |
| 4,810,010 | 3/1989 | Jones | 285/55 |

FOREIGN PATENT DOCUMENTS

| | | | |
|---|---|---|---|
| 512331 | 4/1976 | U.S.S.R. | 285/404 |
| 635346 | 11/1978 | U.S.S.R. | 285/371 |

Primary Examiner—Thomas F. Callaghan

[57] ABSTRACT

The improved tubular joint of the present invention includes the tubular members each having a thickened portion near their adjoining ends which thickened portions have substantially the same stiffness as the thinner portions of the tubular members, an inner band positioned within the thickened ends of the tubular members and an outer band positioned around the thickened ends of the tubular members, said inner band having a plurality of capture plates with each having a threaded openings facing outwardly and registering with the openings of the bolt sleeves which extending through the outer band and the end of each of the tubular members, bolt shafts extending through said bolt sleeves in threaded engagement with said threaded openings in the capture plate and sealed within said bolt sleeves, locking nuts on the outer ends of said bolt shafts, means for sealing between the exterior of the inner band and the interior of each of the tubular members, means for testing the effectiveness of the seal between the inner band and the tubular members, and means for sealing between the ends of the tubular members. In one form of the invention, the ends of the tubular members are beveled and wedges are positioned therebetween and actuated by threads on a bolt shaft to provide sealing and in another form of the invention the ends are square and an "L" shaped seal is provided between the ends of the tubular members and around the interior of one of the tubular members.

5 Claims, 6 Drawing Sheets

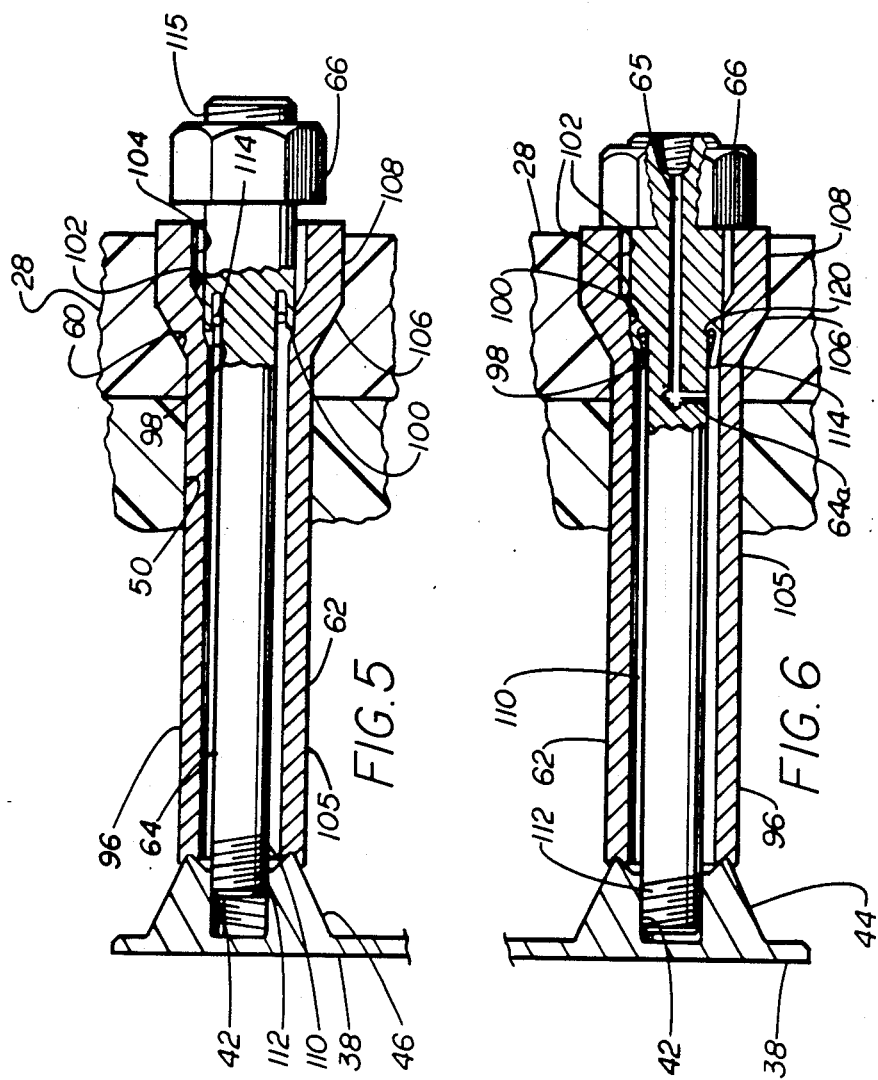

COMPOSITE MATERIAL TUBULAR MEMBER JOINT

BACKGROUND

The present invention relates to an improved joint for tubular members of composite material. As used herein, composite material is intended to mean a fiber reinforced matrix system. Such systems are thought to have application to tubular members such as risers which are used in subsea oil and gas wells to extend from the subsea wellhead to the floating structure at the surface of the body of water, casings which are used to form the outer body or casing of rocket motors, pipe lines and other tubular members functioning to contain or conduct fluids.

In such tubular joints it is preferred that the joint have a uniform deflection in hoop tension along its length to avoid the previous problems of stiffness discontinuity and its impact on seal integrity. Stiffness discontinuity at a tubular joint can produce rotations of the two members relative to each other. Such relative rotations can result in a separation of the sealing surfaces, thus damaging or destroying the seal integrity.

A joint design for tubular members of composite materials is disclosed in the Overath et al U.S. Pat. No. 4,619,470. Each tubular member is formed of an inner jacket of thermoplastic material and an outer jacket of resin impregnated filament wound outer jacket with flanged sleeves threaded onto the rounded threads of the outer jacket at the ends of the two tubular members and having loose rings which are connected together by a plurality of bolts and nuts. A covering collar is provided on the inner end of each tubular member and has radial flange which is spaced from the radial flange of its opposite collar by a sealing member. A distance ring (spacer) is provided between the facing end of the flanges to establish the compression of the sealing member.

The Pierce U.S. Pat. No. 4,634,314 discloses a composite marine riser which includes a tubular body made of carbon or boron filaments embedded in a resin matrix (such as by filament winding) with a corrosion resistant inner sleeve, buoyancy material surrounding the body between radial ribs and surrounded by an outer shell and a water impermeable and non-galvanic active layer surrounding the outer shell. Metal flanges are used to connect riser sections.

The Ahlstone U.S. Pat. No. 3,768,842 discloses a light weight marine riser pipe of wound fiberglass coated with an epoxy or other suitable resin and includes steel connector members to connect adjoining sections together.

The Overath et al U.S. Pat. No. 4,614,369 discloses tubular members including an inner thermoplastic liner with an outer jacket of fiber winding impregnated with synthetic resin with rounded threads on the exterior of the ends of the outer jackets and half shells engaging within the threads on the outer jackets and held in position by clamping rings wedged upwardly on the tapers of the exterior of the half shells.

None of these prior art joints suggests the provision of a joint which would have a uniform hoop deflection along the length of the joint.

SUMMARY

The improved joint of the present invention includes each of the tubular members having a thickened portion near their adjoining ends which thickened portions have substantially the same stiffness as the thinner portions of the tubular members, an inner band positioned within the thickened ends of the tubular members and an outer band positioned around the thickened ends of the tubular members, said inner band having a plurality of capture plates with each having a threaded openings facing outwardly and registering with the openings of the bolt sleeves which extending through the outer band and the end of each of the tubular members, bolt shafts extending through said bolt sleeves in threaded engagement with said threaded opening in the capture plate and sealed within said bolt sleeves, locking nuts on the outer ends of said bolt shafts, means for sealing between the exterior of the inner band and the interior of each of the tubular members, means for testing the effectiveness of the seal between the inner band and the tubular members, and means for sealing between the ends of the tubular members.

An object of the present invention is to provide an improved joint for composite tubular members which avoids problems of stiffness discontinuity.

Another object is to provide an improved joint for composite tubular members having a substantially improved seal integrity by avoiding relative rotation of the members.

A further object is to provide an improved joint for composite tubular members having a reliable consistent sealing surface.

BRIEF DESCRIPTION OF THE DRAWINGS

These and other objects and advantages of the present invention are hereinafter described and explained with reference to the drawings wherein:

FIG. 5 is a detailed sectional view of the bolt shaft and bolt sleeve before preloading.

FIG. 6 is a detailed sectional view of the bolt shaft and bolt sleeve following preloading.

DESCRIPTION OF THE PREFERRED EMBODIMENTS

Figure 1:
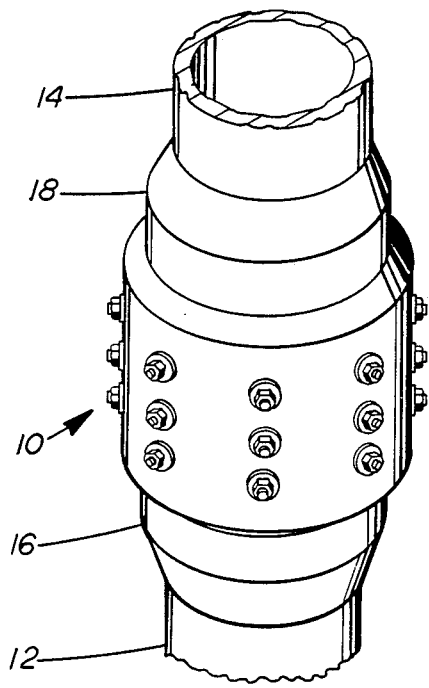
FIG. 1 is an external isometric view of the improved tubular joint of the present invention.
Figure 2:
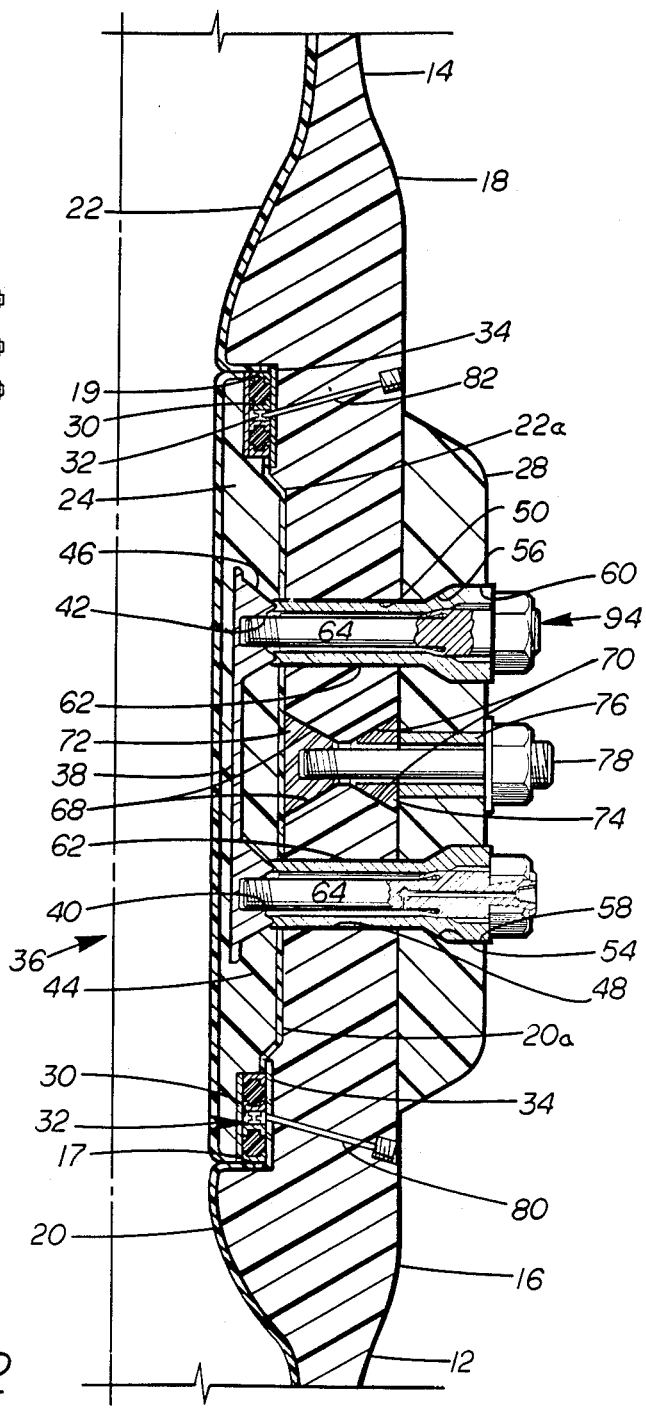
FIG. 2 is a partial sectional view of the improved joint shown in FIG. 1.

Improved joint 10, as shown in FIGS. 1 and 2, is provided between first tubular member 12 and second tubular member 14, both of which are formed of composite material. End 16 of first tubular member 12 is enlarged and is axially aligned with and positioned in close spaced relationship to enlarged end 18 of second tubular member 14. The interior surfaces of tubular members 12 and 14 are provided with elastomer liners 20 and 22. It is preferred that the stiffness of the tubular members 12 and 14 be maintained substantially constant through their thin portions and the thickened portions.

This is accomplished by changing the angle of winding of the filaments to reduce the unit stiffness so that the thickened portions have substantially the same stiffness even through they are substantially thicker than the thinner portions of the tubular members.

As shown, first tubular member 12 tapers outwardly on its outer surface and tapers inwardly on its inner surface into end 16 which has a substantially greater thickness than the remainder of member 12. Second tubular member 14 also has both outer and inner tapered surfaces into end 18 which has a substantially greater thickness than the remainder of member 14. End 16 includes upwardly facing internal landing shoulder 17. End 18 includes downwardly facing internal landing shoulder 19.

Inner band 24 is positioned with its exterior surface 26 engaging liners 20a and 22a within ends 16 and 18 between shoulders 17 and 19 and outer band 28 is positioned in surrounding relation to ends 16 and 18 as shown in FIG. 2. Liner 25 is positioned on the interior of band 24 and is wrapped outwardly on its ends. Recesses 30 are provided in exterior surface 26 of inner band 24 near each end as shown and one of seal assemblies 32 is positioned within each of recesses 30. Liners 20 and 20a and 22 and 22a are interrupted and metal rings 34 are installed on the interior of ends 16 and 18 adjacent shoulders 17 and 19 to provide metal surfaces against which seal assemblies 32 are to seal.

Figure 4:
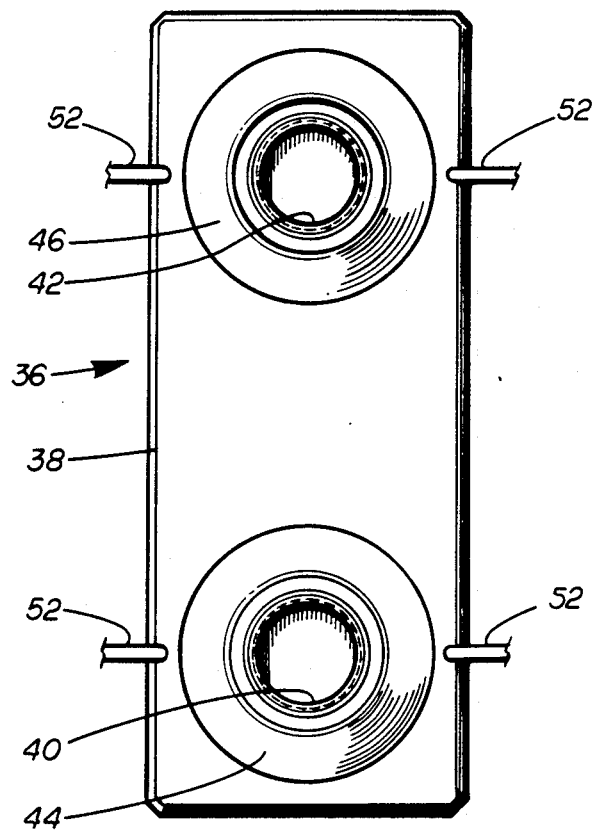
FIG. 4 is a plan view of a capture plate and the connecting means extending between adjacent capture plates and with inner band being omitted for clarity.

Capture means 36 is provided within inner band 24 in the form of a plurality of capture plates 38 spaced circumferentially around band 24 and extending axially so that threaded openings 40 and 42 in hubs 44 and 46 of capture plates 38 extend to the exterior of band 26 and are aligned with openings 48 and 50, respectively, through ends 16 and 18. Straps 52 are connected between capture plates 38 to retain plates 38 in their desired positions circumferentially in inner band 24 as shown in FIG. 4.

Openings 54 and 56 through outer band 28 are aligned with openings 48 and 50 through ends 16 and 18 with the outer portions of openings 54 and 56 being enlarged as shown at 58 and 60 to receive the enlarged ends of bolt sleeves 62 which extend through openings 54 and 48 and through openings 56 and 50 into registry with threaded openings 40 and 42. Bolt shafts 64 extend through bolt sleeves 62 and thread into openings 40 and 42 in capture plates 38. Nuts 66 thread onto the outer ends of bolt shafts 64 and when tightened thereon, engage the outer surface of bolt sleeves 62 as best seen in FIGS. 5 and 6.

The end surfaces of ends 16 and 18 include inner bevel 68 and outer bevel 70 which are engaged by composite inner and outer wedge rings 72 and 74 as shown in FIG. 2. Bolt sleeve 76 extends through outer band 28 with bolt 78 extending through bolt sleeve 76, through outer wedge ring 74 and threads into inner wedge ring 72. Tightening of bolt 78 causes wedge rings 72 and 74 to wedge against bevels 68 and 70.

Figure 3:
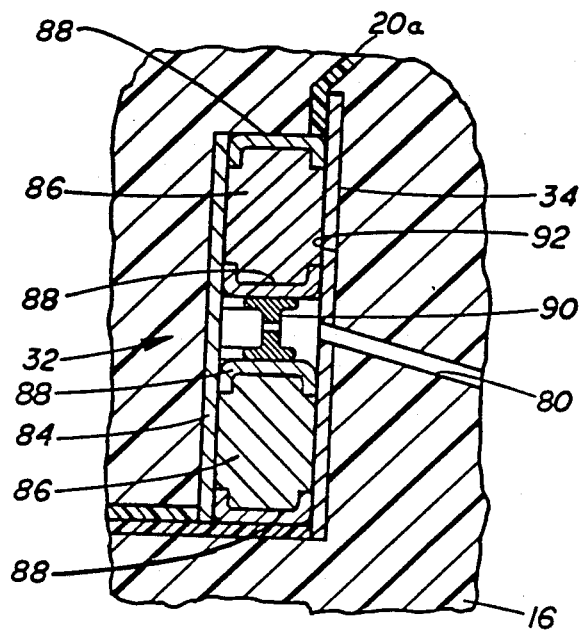
FIG. 3 is a detailed sectional view of the improved seal between the inner band and the tubular members.

Ports 80 and 82 extend through enlarged ends 16 and 18 and metal rings 34 into direct communication with seal assemblies 32 to provide test ports for indicating the effectiveness of seal assemblies 32. As best seen in FIGS. 2 and 3, seal assemblies 32 are positioned in recesses 30 immediately within metal rings 34. Seal assembly 32 includes metal ring 84 positioned on the outer surface of inner band 24 and include a pair of elastomer rings 86 each having metal end caps 88 with seal connecting ring 90 positioned between adjacent end caps 88 as shown. The openings of test ports 80 and 82 are between the end caps 88 which are engaged by connecting ring 90 so that leakage of the first of the elastomer rings 86 and its end caps 88 can be detected prior to the establishing of a leakage path past the other of the elastomer rings 86 and its end caps 88. The end caps 88 are metal and when seal assembly 32 is subjected to pressure the axial compression of elastomer rings 86 causes the ends of the flanges on caps 88 to be urged radially outward and inward into a metal-to-metal sealing engagement with metal ring 84 and metal ring 34. It should be noted that metal rings 34 are positioned in recesses 92 on the interior of tubular members 12 and 14 with elastomer liners 20a and 22a being in covering relationship to the ends of rings 34 at either side of seal assemblies 32.

Fastening means 94 includes bolt sleeves 62, bolt shafts 64, nuts 66 and capture plate 38. The details of fastening means 94 is best shown in FIGS. 5 and 6. Fastening means 94 is shown in FIG. 5 before its preloading and in FIG. 6 in its loaded condition. Bolt shaft 64a shown in FIG. 6 is a modified form with respect to bolt shaft 64 and differs therefrom by including port 65 extending inward from its opening 65a which is threaded to receive a suitable fitting in its outer end for tightening shaft 64a in opening 42 and to conduct pressure from port 65 and exits to the exterior of shaft 64a below the shaft sealing means as shown. Bolt sleeve 62 includes tubular section 96 which extends through the ends 16 and 18 of tubular members 12 and 14 and partially into outer band 28. Sleeve 62 outward of tubular section 96 includes an interior with first outward tapered surface 98, cylindrical surface 100, second outward tapered surface 102 and outer cylindrical surface 104. Sleeve 62 also includes outer surface 105 with outward tapered surface 106 and cylindrical surface 108 which extends to the outer end of bolt sleeve 62 which is a short distance beyond the outer surface of outer band 28. Bolt shafts 64 each include shank 110 with threads 112 on its inner end for engagement within threaded openings 40 or 42 in capture plate 38, skirt 114 which is initially positioned within cylindrical surface 100 and an outer section 115 which is threaded to receive nut 66. Seal ring 120 is positioned within skirt 114 and in surrounding relation to shank 64 in the unloaded condition of fastening means 94. The outer portion of hubs 44 and 46 include annular ridges 44a and 46a surrounding their threaded openings 40 and 42 which mate with the inner ends of bolt sleeves 62 as best seen in FIGS. 5 and 6.

As shown in FIG. 5, fastening means 94 is in its unloaded condition and is not totally threaded into its opening in capture plate 38. With nut 115 is backed away from outer band 28, bolt shaft 64 is threaded tightly into its opening in capture plate 38. This causes skirt 114 to be moved inward on tapered surface 98 so that it is wedged inwardly and thereby causing the inner surface of skirt 114 to engage seal ring 120 so that skirt 114 is resiliently loaded outwardly into sealing engagement with interior surface 98 of sleeve 62. With shaft 64 in this position, nut 115 is tightened on the threaded outer end of bolt shaft 64. When nut 115 tightly engages the exterior surface of sleeve 62, the preload is complete.

Figure 7:
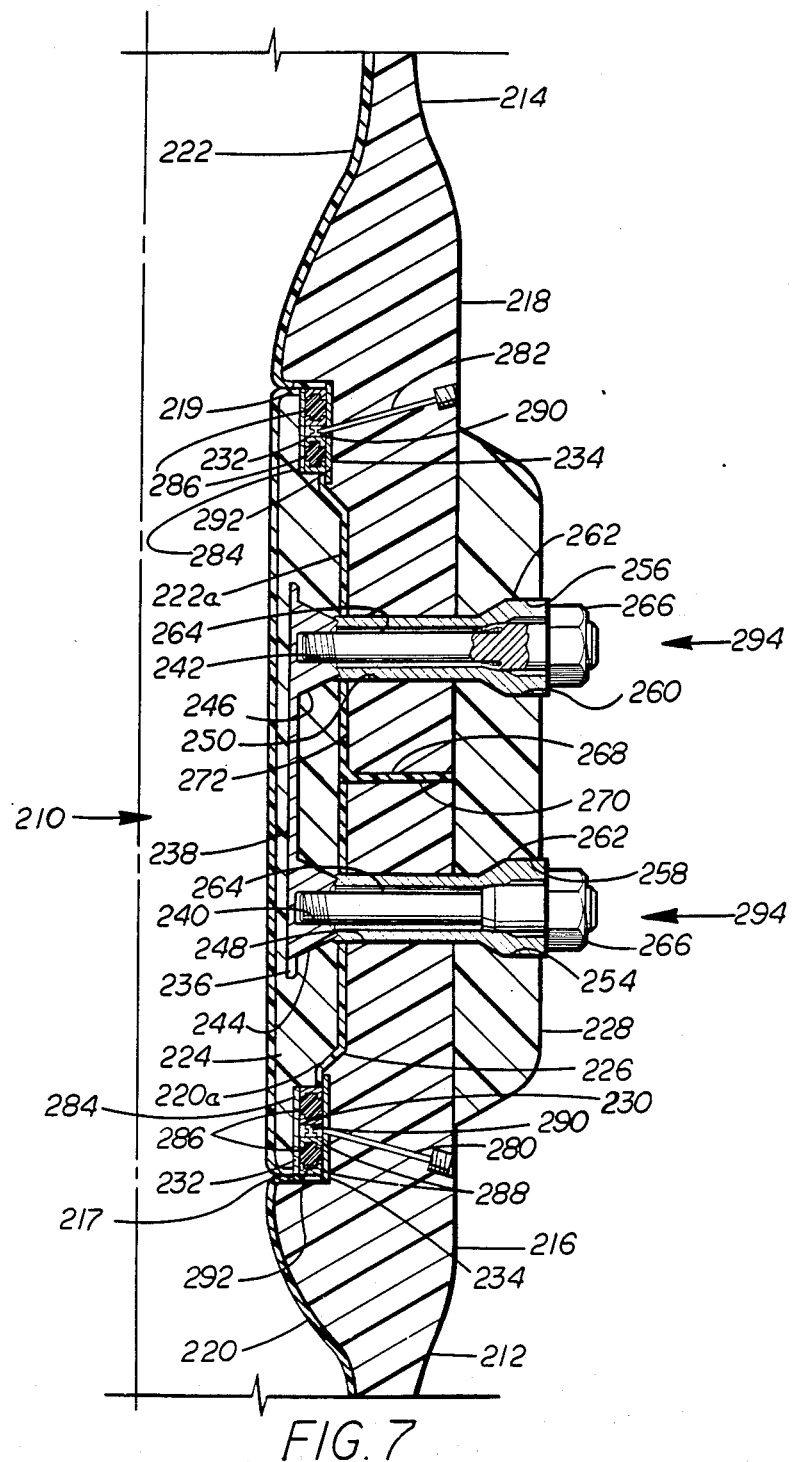
FIG. 7 is a partial sectional view similar to FIG. 1 of another form of the improved tubular joint of the present invention.

Modified joint 210, as shown in FIG. 7, is provided between first tubular member 212 and second tubular member 214, both of which are formed of composite material. As shown, first tubular member 212 tapers outwardly on its outer surface and tapers inwardly on its inner surface into end 216 which has a substantially greater thickness than remainder of member 212. Second tubular member 214 also has both outer and inner tapered surfaces into end 218 which has a substantially greater thickness than the remainder of member 214. End 216 includes upwardly facing internal landing shoulder 217. End 218 includes downwardly facing internal landing shoulder 219. End 216 of first tubular member 212 is axially aligned with and is positioned in close spaced relationship to end 218 of second tubular member 214. The interior surfaces of of the enlarged portions of tubular members 212 and 214 are provided with elastomer liners 220 and 222.

Inner band 224 is positioned with its exterior surface 226 engaging liners 220a and 222a of ends 216 and 218 between shoulders 217 and 219 and outer band 228 is positioned in surrounding relation to ends 216 and 218 as shown in FIG. 7. Liner 225 is positioned on the interior of band 224 and is wrapped outwardly on its ends. Recesses 230 are provided in exterior surface 226 of inner band 224 near each end as shown and one of seal assemblies 232 is positioned within each of recesses 230. Liners 220, 220a and 222, 222a are interrupted and metal rings 234 are installed on the interior of ends 216 and 218 to provide metal surfaces against which seal assemblies 232 are to seal.

Capture means 236 is provided within inner band 226 in the form a plurality of capture plates 238 spaced circumferentially around band 226 and extending axially so that threaded openings 240 and 242 in hubs 244 and 246 of capture plates 238 extend to the exterior of band 226 and are aligned with openings 248 and 250, respectively, through ends 216 and 218. Straps (not shown) are connected between capture plates 238 to retain plates 238 in their desired positions circumferentially in inner band 226.

Openings 254 and 256 through outer band 228 are aligned with openings 248 and 250 through ends 216 and 218 with the outer portions of openings 254 and 256 being enlarged as shown at 258 and 260 to receive the enlarged ends of bolt sleeves 262 which extend through openings 254 and 248 and through openings 256 and 250 into registry with threaded openings 240 and 242. Bolt shafts 264 extend through bolt sleeves 262 and thread into openings 240 and 242 in capture plates 238. Nuts 266 thread onto the outer ends of bolt shafts 264 and when tightened thereon, engage the outer surface of bolt sleeves 262.

The end surfaces 268 and 270 of ends 216 and 218 are substantially straight in a plane transverse to tubular members 212 and 214. Annular seal 272 having an "L"shape in section is positioned between ends 216 and 218 and also between the interior surface of tubular member 212 immediately adjacent its end 216 and the exterior of inner band 224 to provide a seal between such surfaces.

Ports 280 and 282 extend through enlarged portions of ends 216 and 218 and metal rings 234 into direct communication with seal assemblies 232 to provide test ports for indicating the effectiveness of seal assemblies 232. Seal assemblies 232 are positioned in recesses 230 immediately within metal rings 234. Seal assembly 232 includes metal ring 284 positioned on the outer surface of inner band 224 and include a pair of elastomer rings 286 each having metal end caps 288 with seal connecting ring 290 positioned between adjacent end caps 288 as shown. The openings of test ports 280 and 282 are between the end caps 288 which are engaged by connecting ring 290 so that leakage of the first of the elastomer rings 286 and its end caps 288 can be detected prior to the establishing of a leakage path past the other of the elastomer rings 286 and its end caps 288. The end caps 288 are metal and when seal assembly 232 is subjected to pressure the axial compression of elastomer rings 286 causes the ends of the flanges on caps 288 to be urged radially outward and inward into a metal-to-metal sealing engagement with metal ring 284 and metal ring 234. It should be noted that metal rings 234 are positioned in recesses 292 on the interior of tubular members 212 and 214 with elastomer liners 220 and 222 being in covering relationship to the ends of rings 234 at either side of seal assemblies 232.

Fastening means 294 includes bolt sleeves 262, bolt shafts 264, nuts 266 and capture plate 238. The details of fastening means 294 is shown in FIGS. 7. The loading of fastening means 294 is as described with respect to fastening means 94 with reference to FIGS. 5 AND 6.

While joint 210 shown in FIG. 7 is not a joint having a constant hoop displacement as is joint 10, it does have a uniform hoop deflection by virtue of the increase in the dimension of inner band 224 to fit within the enlarged diameter of the end portions of tubular members 212 and 214. By control of the dimensions and stiffness of the individual components of the improved composite joints of the present invention, joints are produced which do not have stiffness discontinuities, which avoid relative rotation of the tubular members and provide a reliable sealing surface for their seals.

Figure 8:
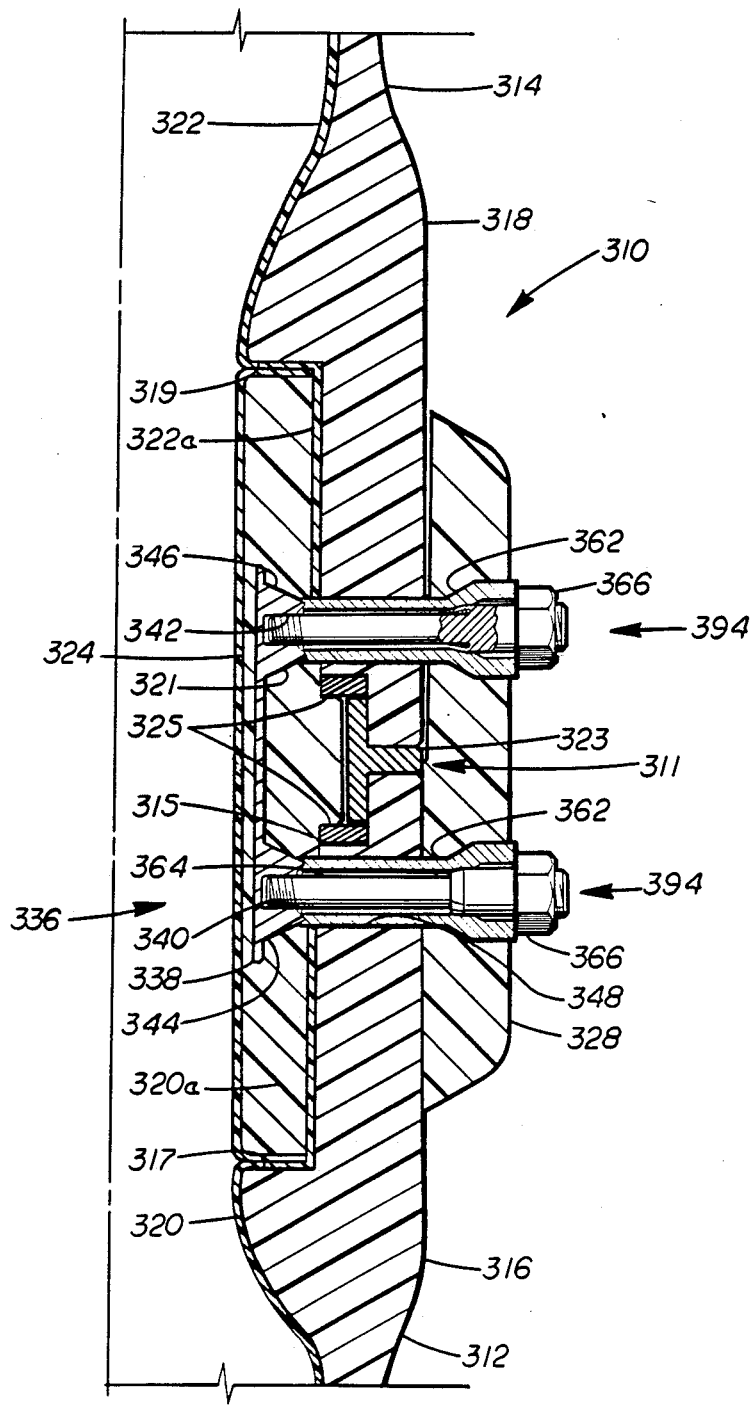
FIG. 8 is a partial sectional view similar to FIG. 1 of another form of the improved tubular joint of the present invention.

Joint 310 shown in FIG. 8 is similar to joints 10 and 210 and similar parts are given the number designation as used in FIG. 1 with the prefix 3. The only change in joint 310 with respect to joint 10 is that its sealing means 311 between end 316 and end 318 is a completely new structure as compared to the joints 10 and 210. Inner band 324 is different in that it includes outer projection 321 between hubs 344 and 346. End 316 includes inner shoulders 317 and 315 facing the shoulders 319 and 315a on end 318. T-shaped seal ring 323 is positioned between the facing surfaces of ends 316 and 318 and seal rings 325 are positioned on shoulders 315, 315a and 321a and 321b and in engagement with the outer edges of the inner portions of seal rings 323.

What is claimed is:
1. A joint for connecting between the ends of composite tubular members having a thickness which is increased at their ends comprising
an inner band of composite material positioned within the ends of the tubular members and extending in length over a substantial portion of their increased thickness,
an outer band of composition material positioned in surrounding relationship to the ends of the tubular members and extending in length over a substantial portion of their increased thickness,
an elastomer lining on the interior of each of said tubular members,
a plurality of bolt sleeves extending through said outer band and through the thickened portion of one of said tubular members,
a plurality of bolt sleeves extending through said outer band and through the thickened portion of the other of said tubular members,
said sleeves for each of said tubular members being arrange uniformly around the tubular member and the outer band in a circle and spaced from the ends of the tubular member, a capture plate within said inner band and having an outwardly facing threaded openings extending to the exterior of said inner band and spaced to register with the openings of said bolt sleeves on the interior of said tubular members, a sealing bolt shaft extending through each of said bolt sleeves and threadedly engaging with the threaded opening in said capture plate registering with the bolt sleeve opening, locking means secured to the outer end of each of said bolt shafts and engaging the outer portion of the bolt sleeve surrounding its bolt shaft, means for sealing between the exterior of said inner band and the interior of each of said tubular members, means for sealing between said bolt shafts and their sleeves, and means for spacing the ends of said tubular members from each other and for sealing between the ends of the tubular members.

2. A joint according to claim 1 wherein said spacing and sealing means includes an inner wedge ring engaging the inner tapered end portion of each of said tubular members, an outer wedge ring engaging the outer tapered end portion of each of said tubular members, a plurality of bolt sleeves extending through said outer band and engaging the exterior of said outer wedge ring, and a bolt extending through each of said bolt sleeves and threaded into said inner wedge ring so that upon tightening of said bolt into said inner wedge ring it is pulled outwardly and the bolt sleeves are moved inwardly against said outer wedge ring.

3. A joint according to claim 1 wherein said spacing and sealing means includes an L-shaped ring seal positioned between the facing ends of said tubular members and having a leg positioned within the interior of one of said tubular members.

4. A joint according to claim 1 wherein said spacing and sealing means includes a T-shaped ring seal having a leg and a base and being positioned between the facing ends of said tubular members and having its base between the inner surfaces of said tubular members and the exterior of said inner band.

5. A tubular joint between tubular members of composite material comprising a first tubular member, a second tubular member aligned with and having its end in close spaced relationship with the end of said first tubular member to which it is to be joined, an inner band surrounded by the ends of the two tubular member ends, an outer band surrounding the ends of the two tubular members, sealing means between the exterior of said inner band and the interior of the ends of the two tubular members, a plurality of fasteners extending through said outer band and the end of said first tubular member into engagement with said inner band, a plurality of fasteners extending through said outer band and the end of said second tubular member into engagement with said inner band, means for tensioning said fasteners, means protecting said tubular member ends and said bands from excessive axial compression responsive to tensioning of said fasteners, means for testing the sealing means between said inner band and said tubular member ends, means for axially preloading the adjacent ends of said first and second tubular members to minimize the amount of bending of said joint at the plane between the two ends.

* * * * *